(12) United States Patent
Ungar (10) Patent No.: US 6,594,820 B1
(45) Date of Patent: Jul. 15, 2003

(54) METHOD AND APPARATUS FOR TESTING A PROCESS IN A COMPUTER SYSTEM

(75) Inventor: David Ungar, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/406,502

(22) Filed: Sep. 28, 1999

(51) Int. Cl.$^7$ ............... G06F 9/44; H02H 3/05
(52) U.S. Cl. ............... 717/124; 717/126; 717/127; 714/38
(58) Field of Search ............... 717/124, 130, 717/131, 160, 161, 126, 127; 714/38

(56) References Cited

U.S. PATENT DOCUMENTS

| | | | | |
|---|---|---|---|---|
| 4,620,282 A | * | 10/1986 | Shelley | 716/4 |
| 4,994,991 A | | 2/1991 | Richman | |
| 5,204,956 A | * | 4/1993 | Danuser et al. | 714/47 |
| 5,805,795 A | * | 9/1998 | Whitten | 714/38 |
| 5,831,998 A | | 11/1998 | Ozmizrak | |
| 5,920,724 A | * | 7/1999 | Chang | 717/161 |
| 6,041,408 A | * | 3/2000 | Nishioka et al. | 713/171 |
| 6,125,359 A | * | 9/2000 | Lautzenheiser et al. | 706/60 |
| 6,125,458 A | * | 9/2000 | Devan et al. | 714/43 |
| 6,173,440 B1 | * | 1/2001 | Darty | 717/130 |
| 6,327,701 B2 | * | 12/2001 | Ungar | 717/131 |
| 6,330,332 B1 | * | 12/2001 | Itoh et al. | 380/28 |

OTHER PUBLICATIONS

Austin, et al., "Efficient Detection of All Pointer and Array Access Errors", 1994, ACM, p. 290–301.*

* cited by examiner

Primary Examiner—Kakali Chaki
Assistant Examiner—Qamrun Nahar
(74) Attorney, Agent, or Firm—Gunnison, McKay & Hodgson, L.L.P.; Philip J. McKay (57) ABSTRACT

A method and apparatus for testing processes in a computer system are described. In a software process, there exist many test points in the execution of the process where stress testing may be applied. The process is executed with stress testing applied at selected test points and test intervals. The selected test points are based on prime numbers and varied for successive execution iterations. An efficient distribution of evaluated test points is achieved, and all possible test points are ultimately evaluated within a small number of execution iterations. In one embodiment, the total number of test points is first determined. A first execution run is evaluated at selected test points that correspond to prime numbers greater than the square root of the total number of test points. Subsequent execution iterations are then performed evaluating test points at selected test intervals, where the test intervals for respective execution iterations correspond to prime numbers less than or equal to the square root of the total number of test points. The prime numbers for the selected test intervals are chosen in decreasing order, for example.

25 Claims, 9 Drawing Sheets

METHOD AND APPARATUS FOR TESTING A PROCESS IN A COMPUTER SYSTEM

BACKGROUND OF THE INVENTION

1. Field of the Invention

This invention relates to the field of computer software, and, more specifically, to testing and debugging processes.

Sun, Sun Microsystems, the Sun logo, Java and all Java-based trademarks and logos are trademarks or registered trademarks of Sun Microsystems, Inc. in the United States and other countries. All SPARC trademarks are used under license and are trademarks of SPARC International Inc. in the United States and other countries. Products bearing SPARC trademarks are based upon an architecture developed by Sun Microsystems, Inc.

2. Background Art

One step in software development is testing and verification of a product. The software product is typically executed under a variety of conditions, and any faults are reported for subsequent correction. In some software systems, there are extra operations, such as monitoring or "housekeeping" subprocesses or routines (e.g., garbage collection), that may be carried out at various points (referred to herein as "test points") in the execution of a process (e.g., an application, program or portion thereof). During ordinary execution, a process may cause or permit execution of these extra operations at any one or more of these test points by intermittently branching to the subprocess handling those extra operations.

Ideally, for exhaustive testing purposes, it is desirable to evaluate the execution of these extra operations at all such test points to verify that each such test point does not have any errors associated with it. However, if executed at every possible test point in a single execution of the main process, these extra operations may entail prohibitive performance cost in the execution of the process or program, particularly for more complicated functions. For example, it may take an inordinate amount of time for a process to execute beyond its initial stages due to frequent branching to a subprocess. Thus, evaluation of test points occurring later in the execution of the main process is undesirably delayed while the earlier portions of the process are exhaustively tested. Also, for time-critical applications, the slow-down in performance may disrupt normal operations, diminishing the effectiveness of such tests.

Figure 1:
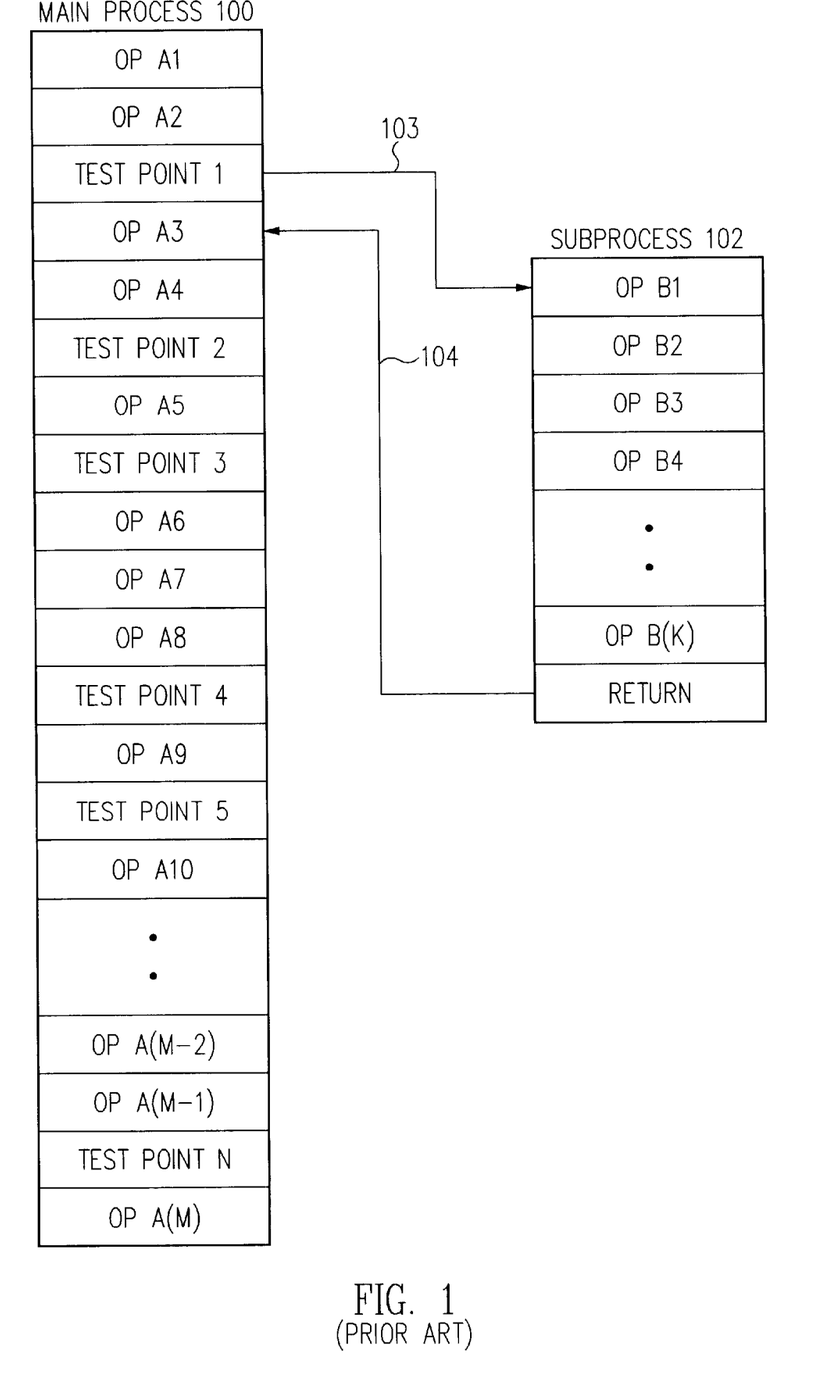
FIG. 1 is a block diagram of a primary executing process and an evaluation subprocess.

FIG. 1 is a block diagram illustrating the branching of a main process to a subprocess at one or more test points. Considering an intermittent garbage collection example, executing process 100 represents a program under execution and subprocess 102 represents the system's garbage collector for recovering unused memory resources. Executing process 100 may be a program running on an underlying virtual machine (VM) or operating system, and may contain one or more threads of execution, each of which may contain a plurality of garbage collection points (gc-points) that can be considered test points. During normal execution, executing process 100 may branch to the garbage collector subprocess 102 at any one (or more) of those gc-points to permit recovery of memory resources. Branching may be explicitly performed via direct or indirect branching instructions in the executing process, or branching may be performed by the release of processor or VM execution control by a currently executing thread to enable the execution of a second thread supporting the subprocess (i.e., via cooperative scheduling).

In FIG. 1, executing process 100 contains M operations or instructions OP A1 through OP A(M), interspersed with test points 1–N. Subprocess 102 contains K operations OP B1 through OP B(K). As indicated by arrow 103, executing process 100 may branch to the first operation OP B1 of subprocess 102 from any test point (e.g., from test point 1) to initiate execution of subprocess 102. When execution of subprocess 102 is completed (i.e., OP BK has been executed), subprocess 102 returns (arrow 104) to the operation (e.g., OP A3) following the test point from which branching occurred.

If branching occurs at only a limited number of the N test points, the impact of executing the extra instructions of subprocess 102 is acceptable. However, if subprocess 102 is executed at each of the N test points in an exhaustive test execution, the total execution time of process 100 may increase substantially for large values of N. Also, the K increases, the interruption and slow-down of process 100 becomes more prohibitive.

One method for reducing the disruptive nature of test point evaluation is to evaluate (e.g., branch to a subprocess) at a subset of the possible test points, selecting those test points to be evaluated based upon a pseudo-random distribution of test points. An irregular sampling of test points is achieved with less performance cost than the exhaustive technique of evaluating every test point. However, not all test points are tested. Even across multiple executions of the process with different pseudo-random distributions of test points, there is no mechanism for ensuring that all test points are ultimately evaluated. Pseudo-random techniques therefore provide only incomplete evaluation results.

The problem associated with evaluating test points are more clearly understood with reference to an example test point situation. For this purpose, the example of an intermittent garbage collection system is described in more detail below.

Garbage Collection Example of an Intermittent Subprocess

Garbage collection is an important aspect of memory management in most modern computer systems. Garbage collection (GC) refers to the process of reclaiming portions of main memory that are no longer in use by the system or any running applications. The execution of programs in a computer system is typically interrupted intermittently to permit the garbage collection process to run. Ideally, the frequency of these interruptions is kept low to impact the execution of other programs as little as possible.

In an object-oriented system, for example, garbage collection is typically carried out to reclaim memory allocated to objects and other data structures (e.g., arrays, etc.) that are no longer referenced by an application. The reclaimed memory can then be re-allocated to store new objects or data structures. The garbage collection process may be either conservative or extract. Conservative garbage collection involves scanning memory space for stored values that match the address of an object (or other memory structure) that is being considered for collection. If a matching value is not found in the memory being scanned, then no references to the object exist, and the object may be safely collected. If a matching value is found, it is assumed that the value is a reference (e.g., a pointer) to the object under consideration, and the object is not collected.

In exact garbage collection, only true references (pointers) are considered in a scan, so coincidentally matching data values are ignored in the collection process. This means that an object without any associated references is always considered garbage in a scan, and more efficient collection is achieved. However, to perform exact garbage collection, the scanning process must have reliable information regarding which memory locations contain live references (i.e., active, non-null references). Only those memory locations containing live references are scanned to determine reference matches for objects under consideration for collection.

To provide more efficient use of memory space in terms of compaction, "copying" garbage collection is commonly implemented. In copying garbage collection, the memory space is divided into regions and an object transfer is performed. When garbage collection is carried out, objects in a portion of memory referred to an "from" space are copied to a portion referred to as "to" space. Those objects in "from" space that are considered "garbage" by the scan process are not copied to "to" space. The process of copying the objects results in reduced fragmentation of the memory space and better compaction.

The process of performing garbage collection, i.e., the steps of scanning memory and collecting unreferenced resources, is a nontrivial task. This is particularly true for copying garbage collection, which can entail many expensive memory transfer operations. If garbage collection is performed at every possible opportunity, as is desired for exhaustive testing, the garbage collection process will cause the execution of the main process or program to be frequently interrupted and undesirably slowed. Yet, thorough testing of the garbage collection process is necessary to ensure proper, noncorrupting memory management.

Garbage Collection in a Virtual Machine

Garbage collection is also necessary in runtime environments including virtual machines. A virtual machine is a software mechanism that provides a level of abstraction from the instructions implemented by the underlying hardware computer system. The virtual machine typically implements a garbage collector to re-allocate memory for data structures used to support those processes (e.g., programs and supporting processes) executed by the virtual machine.

Figure 2:
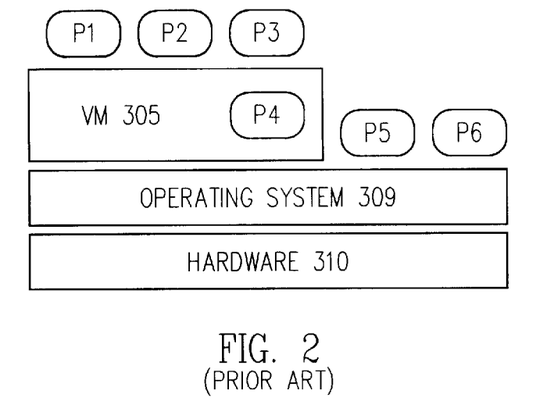
FIG. 2 is a block diagram of a computer system comprising a virtual machine.

FIG. 2 illustrates a computer system comprising a virtual machine. The computer system includes computer hardware 310, operating system 309, virtual machine (VM) 305 and multiple executing processes (P1–P6). Computer hardware 310 comprises, for example, a processor, physical memory, and input/output mechanisms.

Hardware 310 supports execution of a particular instruction set based on the given processor architecture (e.g., SPARC, Pentium, etc.). Operating system 309 runs on top of hardware 310, and provides a software foundation of system functions such as file organization, memory management, windows support, etc. Operating system 309 provides an interface to overlying processes which permit those processes to access the system functions through OS calls. Virtual machine 305 executes on top of operating system 309, and provides an execution environment abstracted from the underlying hardware 310. For example, VM 305 may support a different instruction set from that of hardware 310.

In this discussion, a process may be an application program, subroutine, thread or other unit of executable operations. Processes executing within the system of FIG. 2 may execute on top of operating system 309, making use of the execution environment directly supported by operating system 309 and hardware 310, or processes may execute in the environment provided by VM 305. As shown, processes P1–P3 are executed by VM 305, and processes 5–6 are executed on top of operating system 309. Internal processes of VM 305, such as process P4, may be either executed on top of VM 305 (e.g., as interpreted virtual machine code) or in parallel with VM 305 as "native" code of the underlying operating system 309 and hardware 310. For purposes of illustration, an embodiment of a runtime environment implementing a virtual machine is described below.

Object-oriented applications typically comprise one or more object classes and interfaces. In many programming languages, a program is compiled into machine-dependent, executable program code. However, classes may also be written in the a programming language that supports compiling of those classes into machine independent bytecode class files. In a bytecode class file implementation, each class may contain, for example, code and data in a platform-independent format called the class file format. The computer system acting as the execution vehicle contains a program called a virtual machine, which is responsible for executing the code in each class.

Applications may be designed as standalone applications, or as "applets" which are identified by an applet tag in an HTML (hypertext markup language) document, and loaded by a browser application. The class files associated with an application or applet may be stored on the local computing system, or on a server accessible over a network. Each class is loaded into the virtual machine, as needed, by the "class loader."

The classes of an application or applet are loaded on demand from the network (stored on a server), or from a local file system, when first referenced during the application or applet's execution. The virtual machine locates and loads each class file, parses the class file format, allocates memory for the class's various components, and links the class with other already loaded classes. This process makes the code in the class readily executable by the virtual machine.

Figure 3:
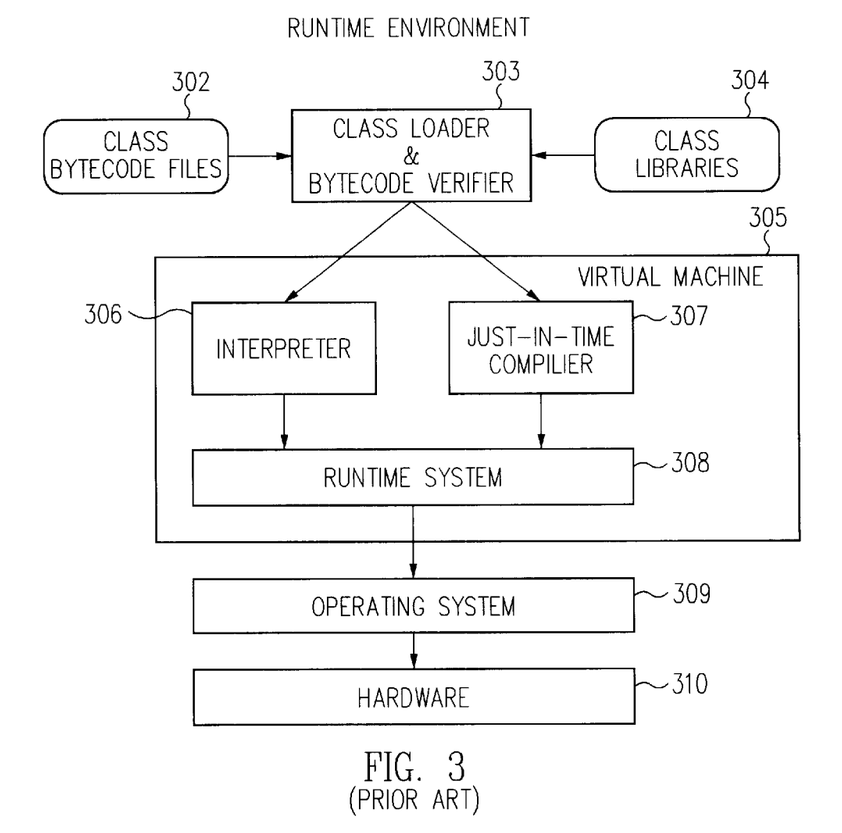
FIG. 3 is a block diagram of an example runtime environment.

FIG. 3 illustrates one example of a runtime environment. In the compile environment, a software creates sources files that contain the programmer readable class definitions, including data structures, method implementations and references to other classes. Those source files are provided to a pre-compiler, which compiles the source files into compiled ".class" files 302 that contain bytecodes executable by a virtual machine. Bytecode class files 302 are stored (e.g., in temporary or permanent storage) on a server, and are available for download over a network. Alternatively, bytecode class files 302 may be stored locally in a directory on the client platform.

The runtime environment contains a virtual machine 305 which is able to execute bytecode class files and execute native operating system ("O/S") calls to operating system 309 when necessary during execution. As stated previously, virtual machine 305 provides a level of abstraction between the machine independence of the bytecode classes and the machine-dependent instruction set of the underlying computer hardware 310, as well as the platform-dependent calls of operating system 309.

Class loader and bytecode verifier ("class loader") 303 is responsible for loading bytecode class files 302 and supporting class libraries 304 into virtual machine 305 as needed. Class loader 303 also verifies the bytecodes of each class file to maintain proper execution and enforcement of security rules. Within the context of runtime system 308, either an interpreter 306 executes the bytecodes directly, or a "just-in-time" (JIT) compiler 307 transforms the bytecodes into machine code, so that they can be executed by the processor (or processors) in hardware 310.

The runtime system 308 in virtual machine 305 supports a general stack architecture. The manner in which this general stack architecture is supported by the underlying hardware 310 is determined by the particular virtual machine implementation, and reflected in the way the byte-codes are interpreted or JIT-compiled. Other elements of the runtime system include, for example, thread management (e.g., scheduling) mechanisms and the garbage collector.

In the virtual machine, garbage collection is performed to reclaim memory space from a region of memory known as the heap. The heap is used to store objects and arrays that are referenced by pointers stored as local variables in activation records, or "stack frames," of a stack associated with an individual thread of execution in the virtual machine. Threads may be associated with programs being executed by the virtual machine, or with processes of the virtual machine itself. The invocation of a method by a given thread results in the creation of a new stack frame that is "pushed" onto the stack of that thread. References to objects on the heap may be removed by an active (i.e., currently executing) method setting the respective pointer to a "null" value, or by removal of a respective stack frame in response to completion of its associated method.

In any thread of execution, there may be many garbage collection points, or "gc-points," where garbage collection can occur. However, actual garbage collection typically takes place at only a fraction of these possible gc-points each time the given thread of execution is run. In virtual machine implementations using a compiler, to facilitate exact garbage collection, the compiler may provide information at each gc-point about the set of locations in the stack frames that contain pointers to objects or arrays. Garbage collection is performed by determining which objects and arrays in the heap are referenced from within the set of locations specified by the compiler, and reclaiming those objects and arrays that are no longer referenced.

Unfortunately, the compiler may have an error (i.e., a "bug") that causes a stack location to be mistakenly omitted from the specified set of pointer locations. This type of compiler bug can result in the reclaiming of an object or array when a reference still exists. Also, for copying garbage collection, this compiler bug may result in a failure to update a pointer reference to point to the appropriate copy of the associated object or array. In either case, future references made to the object or array through the omitted stack location can result in improper execution of an application. It is desirable to determine whether the garbage collector and the compiler are operating correctly at every gc-point. Testing is typically done by executing a program in the virtual machine and observing the behavior of the garbage collector at the gc-points associated with the program.

Stress tests attempt to test a range of execution conditions that will result in the triggering and resulting detection any bugs in the system. However, with respect to garbage collection, a stress test will only result in testing at gc-points where garbage collection actually occurs in the testing program. Because garbage collection occurs at only a subset of gc-points, and because that subset of gc-points may not differ from one execution to the next for a particular application or input data set, stress tests are insufficient to reliably and exhaustively find bugs associated, for example, with the misidentification of a live reference at possibly a single gc-point out of many in the execution of the application. Conditions may be such that the compiler produces errors at untested gc-points. A mechanism is desired which provides exhaustive testing for test point scenarios such as garbage collection without entailing the prohibitive performance costs associated with evaluation of every test point.

SUMMARY OF THE INVENTION

A method and apparatus for testing processes in a computer system are described. In a software process, there exist many test points in the execution of the process where stress testing may be applied. Testing every test point in a single execution can be prohibitively slow. In accordance with the invention, the process is executed with stress testing applied at selected test points and test intervals. The selected test points are based on prime numbers and varied for successive execution iterations. An efficient distribution of evaluated test points is achieved, and all possible test points are ultimately evaluated within a small number of execution iterations.

In an embodiment of the invention, the total number of test points is first determined. A first execution run is evaluated at selected test points that correspond to prime numbers greater than the square root of the total number of test points. Subsequent execution iterations are then performed evaluating test points at selected test intervals, where the test intervals for respective execution iterations correspond to prime numbers less than or equal to the square root of the total number of test points. The prime numbers for the selected test intervals are chosen in decreasing order, for example. In another embodiment, the first execution run is performed subsequent to the execution iterations using the selected test intervals.

DETAILED DESCRIPTION OF THE INVENTION

The invention is a method and apparatus for testing processes in a computer system. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Embodiments of the invention utilize primer numbers as the basis for assigning or selecting test points that are evaluated during multiple execution runs. A desirable balance is achieved between a reduction in the number of evaluated test points and efficient selection of sufficient test points to provide maximal debugging coverage in a minimal amount of time. By using prime numbers, it is ensured that, over the course of a small, predetermined number of execution iterations, all test points will be evaluated, with little or no test point evaluation redundancy and with a greater variety of test points evaluated earlier in the debugging process.

Exhaustive evaluation is assured because every test point is either a prime number or an integer multiple of a prime number that is less than or equal to the square root of the total number of test points. Prime numbers include all whole numbers whose factors consist solely of one and the number itself. For example, the number five has as its factors the numbers 1 and 5 (i.e., 1×5=5), and is therefore prime. The number six, however, has as its factors the numbers 1, 2, 3 and 6 (i.e., 1×6=2×3=6), and is therefore not prime. Yet, the number six is a multiple of the primer number three.

An embodiment of the invention performs successive execution iterations using selected test intervals to evaluate all test points that correspond to prime numbers less than or equal to the square root of the total number of test points, as well as the multiples of those prime numbers. A further execution run is performed to evaluate the remaining test points, i.e., those test points corresponding to prime numbers greater than the square root of the total number of possible test points. The following chart illustrates some examples of values for the total number of test points (T) and the corresponding numbers of execution iterations performed to evaluate all test points in accordance with an embodiment of the invention.

time in the form of a "next selected test point." In the predetermined scheme, selected test points may be identified all at once (e.g., by providing the full plan of test points), or the selected test points may be metered out one at a time, as with the "on the fly" scheme.

By implementing an aperiodic evaluation of prime test points and varying the test intervals of subsequent execution iterations, embodiments of the invention test processes across multiple phases to provide strong bug detection performance in the presence of processes or bugs with periodic behavior. Ordinarily, a bug may be overlooked if its occurrences are synchronized with test point evaluations such that (a) test points with bugs are always bypassed, or (b) the apparent constant behavior of the bug causes the tester/debugger to interpret the bug as legitimate code. Embodiments of the invention have sufficient aperiodic or multi-phase test point sampling to minimize synchronization with periodic bugs. Further, embodiments of the invention are likely to detect such periodic bugs across multiple execution iterations, providing greater confidence in the identification of such bugs.

Figure 4:
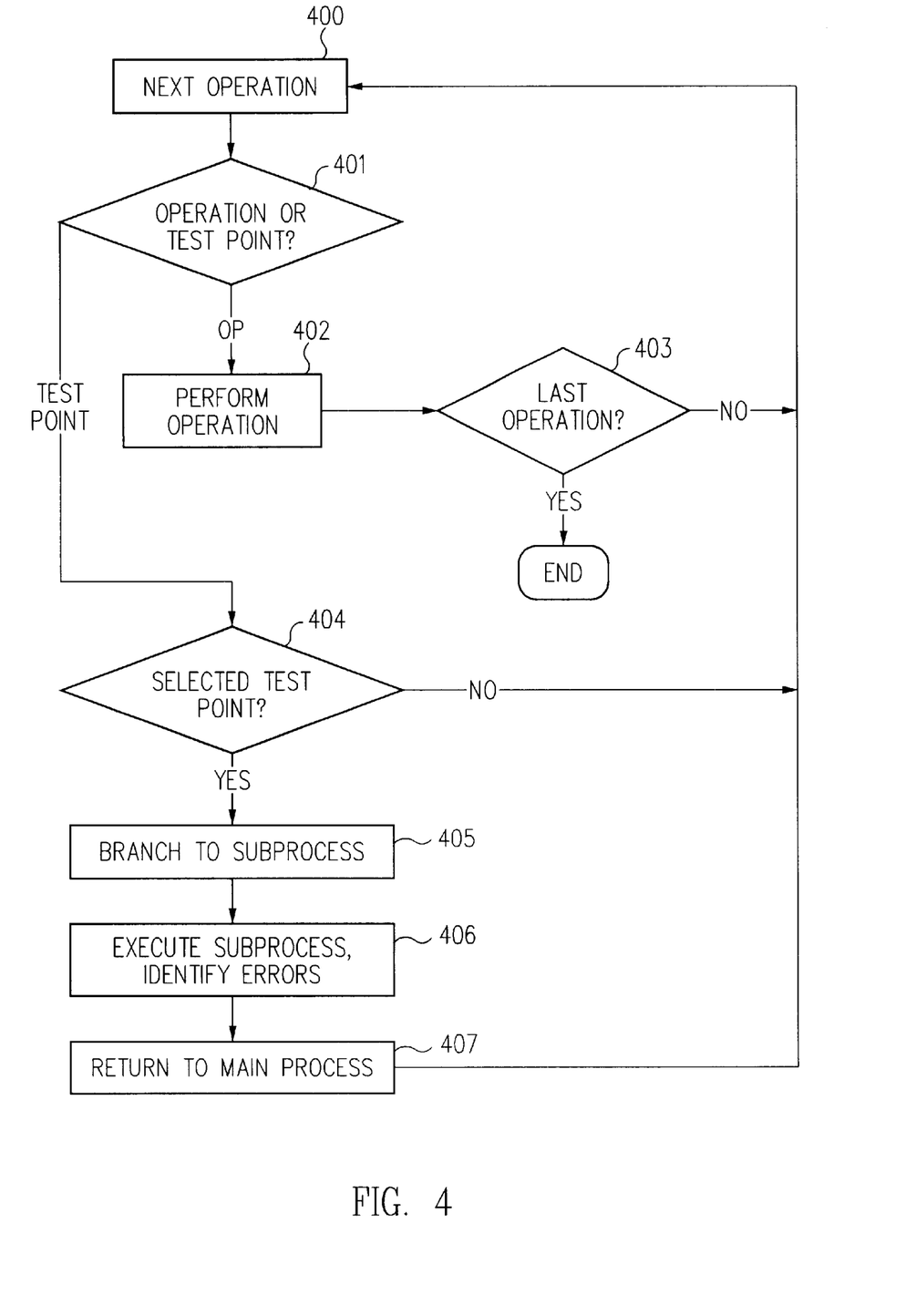
FIG. 4 is a flow diagram of the execution of a process in accordance with an embodiment of the invention.

FIG. 4 is a flow diagram illustrating a method for executing a main process with selected test points in accordance with an embodiment of the invention. The method of FIG. 4 may be enacted, for example, when a testing or debugging mode is engaged. Implementation of the method may include, for example, an underlying development environment, a runtime system, one or more parallel processes, the main process itself, or a combination of two or more of the foregoing elements.

In step 400 of FIG. 4, the next operation (initially, the first operation) of the main process is obtained. The operation may be, for example, a single instruction to be executed by

| TOTAL NUMBER OF TEST POINTS (T) | TEST POINTS IN FIRST ITERATION INCLUDE: 1 AND ALL PRIMES P, WHERE: | TEST POINTS IN FURTHER ITERATIONS INCLUDE: ALL MULTIPLES OF PRIME P (i.e., P, 2P, 3P, . . . , KP; KP <= T), WHERE P IS ONE OF: | NUMBER OF EXECUTION ITERATIONS |
|---|---|---|---|
| 9 <= T < 25 | 5 <= P <= T | 2, 3 | 3 |
| 25 <= T < 49 | 7 <= P <= T | 2, 3, 5 | 4 |
| 49 <= T < 121 | 11 <= P <= T | 2, 3, 5, 7 | 5 |
| 121 <= T < 169 | 13 <= P <= T | 2, 3, 5, 7, 11 | 6 |
| 169 <= T < 289 | 17 <= P <= T | 2, 3, 5, 7, 11, 13 | 7 |
| 289 <= T < 361 | 19 <= P <= T | 2, 3, 5, 7, 11, 13, 17 | 8 |
| 361 <= T < 529 | 23 <= P <= T | 2, 3, 5, 7, 11, 13, 17, 19 | 9 |
| 529 <= T < 841 | 29 <= P <= T | 2, 3, 5, 7, 11, 13, 17, 19, 23 | 10 |

In embodiments of the invention, the selected test points may be determined "on the fly" during process execution, e.g., by determining the next selected test point for evaluation during or subsequent to evaluation of the current selected test point. Also, in other embodiments, the selected test points may be predetermined, e.g., by determining a plan specifying all selected test points for all execution iterations prior to the process execution. By predetermining the selected test points, redundancies in selected test points between iterations may be removed from the plan before execution. Otherwise, extra steps may be needed to record past selected test points for comparison with each new selected test point determined "on the fly." If there is a match between a new selected testpoint and a past selected test point (i.e., the selected test point was already evaluated), then the new selected test point may be skipped. In the "on the fly" scheme, selected test points are identified one at a a processing environment or runtime system. If, in step 401, the current operation is not a test point, the operation is carried out in step 402. In step 403 (following step 402), if the operation is the final operation in the main process, execution completes. Otherwise, from step 403, the method returns to step 400 to obtain the next operation.

If, in step 401, the current operation is a test point, the method continues in step 404. From step 404, if the test point does not correspond to a selected test point, the subprocess is not executed, and the method returns to step 400 to obtain the next operation for execution. If, at step 404, the test point does correspond to a selected test point, then the main process branches to the subprocess at step 405. In step 406, the subprocess is executed, and any errors are flagged or logged for correction. In subsequent step 407, the subprocess returns to the main process (e.g., by branching back to the main process operation after the current test point). Upon returning to the main process, the next operation is obtained at step 400.

Figure 5:
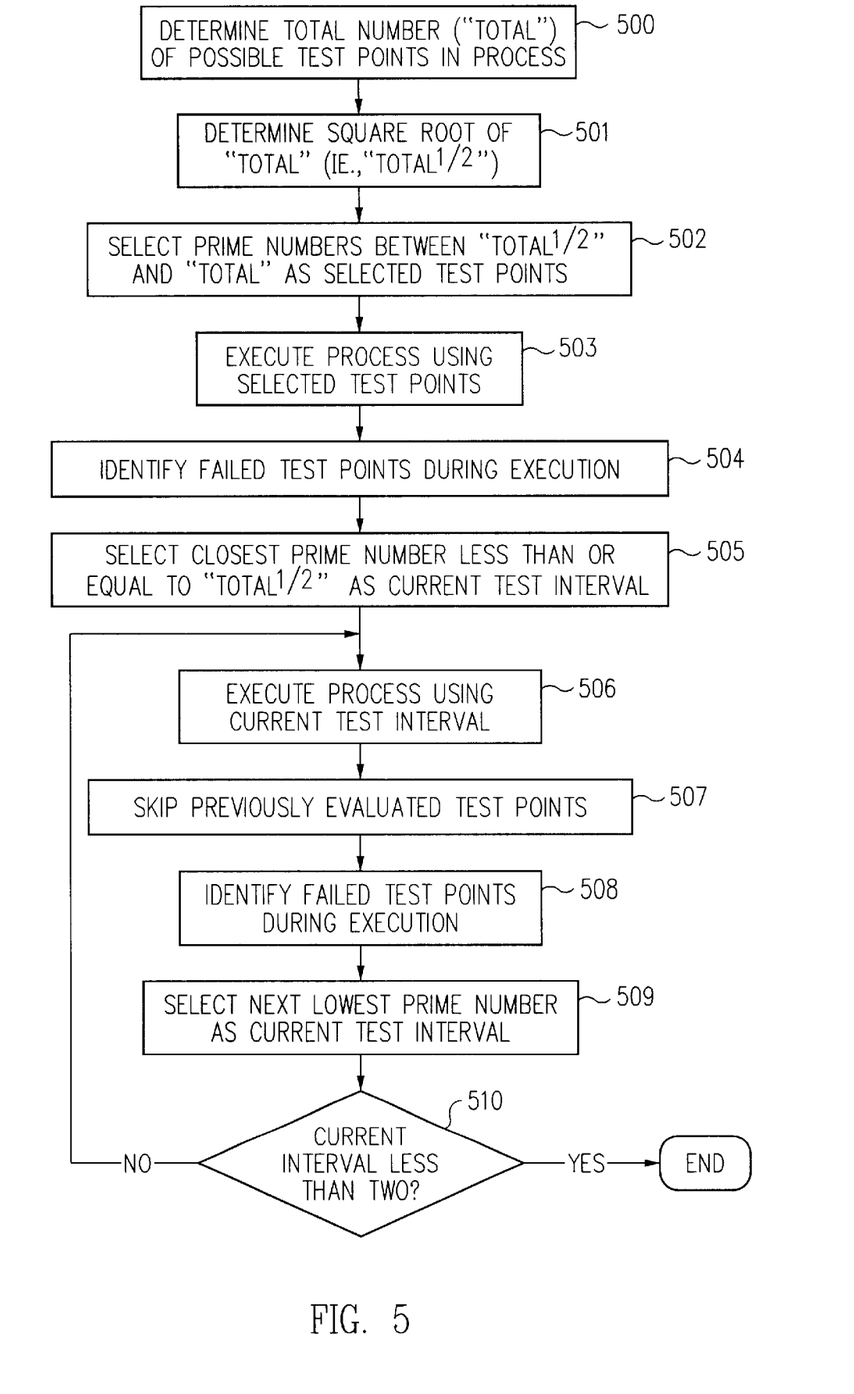
FIG. 5 is a flow diagram illustrating selected test point execution based on primer numbers, in accordance with one or more embodiments of the invention.

FIG. 5 is a flow diagram of a method for testing processes in accordance with one or more embodiments of the invention. The described ordering provides a broad distribution of evaluated test points during each execution iteration. A reduction in the number of evaluated test points is achieved by, in the later execution runs, omitting or bypassing those test points that were previously evaluated in the earlier execution iterations (e.g., test point ten may be bypassed when the test interval is two if test point ten was previously evaluated when the test interval was five).

In the following description, steps 505–510 refer to execution iterations in which the selected test points are based on respective prime numbers for which the square of the prime number is less than or equal to the total number of test points in the process. The selected test points for each iteration include the given prime number and all multiples of the given prime number (i.e., the selected test points define a test interval based on the given prime number). Steps 52–504 refer to a single execution iteration comprising those test points not included in the execution iterations of steps 505–510, namely the first test point and those prime numbers for which the square of the prime number is greater than the total number of test points. The execution run defined by steps 502–504 may occur either before or after the execution iterations defined by steps 505–510.

In step 500 of FIG. 5, the main process is analyzed or executed to determined the total number (TOTAL) of possible test points in the execution of the process. In step 501, the square root of the total number of test points (TOTAL$^{1/2}$) is determined, and in step 502, prime numbers between TOTAL$^{1/2}$ and TOTAL are chosen as the selected test points for the first execution run (i.e., all prime numbers P, where TOTAL$^{1/2}$>P>=TOTAL). The first test point (e.g., test point 1) is also typically included as a selected test point in the first execution iteration, though test point 1 may alternatively be evaluated in any of the other execution iterations. Once the selected test points are determined, the main process is executed in step 503, evaluating the selected test points as they arise. Any failed test points are identified for the first execution run in step 504.

In step 505, the nearest prime number that is less than or equal to TOTAL$^{1/2}$ is selected as the current test interval. That is, the selected test points include the selected prime number and each of its multiples. In step 506, the main process is executed using the current test interval. As indicated in step 507, the selected test points exclude or skip any test points that have been evaluated in a previous iteration (e.g., test point 6 is not evaluated in connection with prime number 2, if test point 6 was previously evaluated in connection with prime number 3). In step 508, any failed test points are identified or flagged as they occur during execution. In step 509, the next lowest prime number is selected as the current test interval. In step 510, if the current test interval is equal to or greater than two, the method returns to step 506 to re-execute the main process for the next test iteration. However, if, in step 510, the current test interval is less than two (i.e., equals one), all necessary prime numbers between two and TOTAL$^{1/2}$ have been tried, and the testing process completes.

The test point selection steps of FIG. 5 (e.g., steps 502, 505 and 509) may be performed in conjunction with each respective execution iteration in accordance with the previously described "on the fly" scheme. Alternatively, the test point selection steps may be carried out prior to execution of the process, to generate a plan of test points in accordance with the described predetermination scheme.

Figure 6:
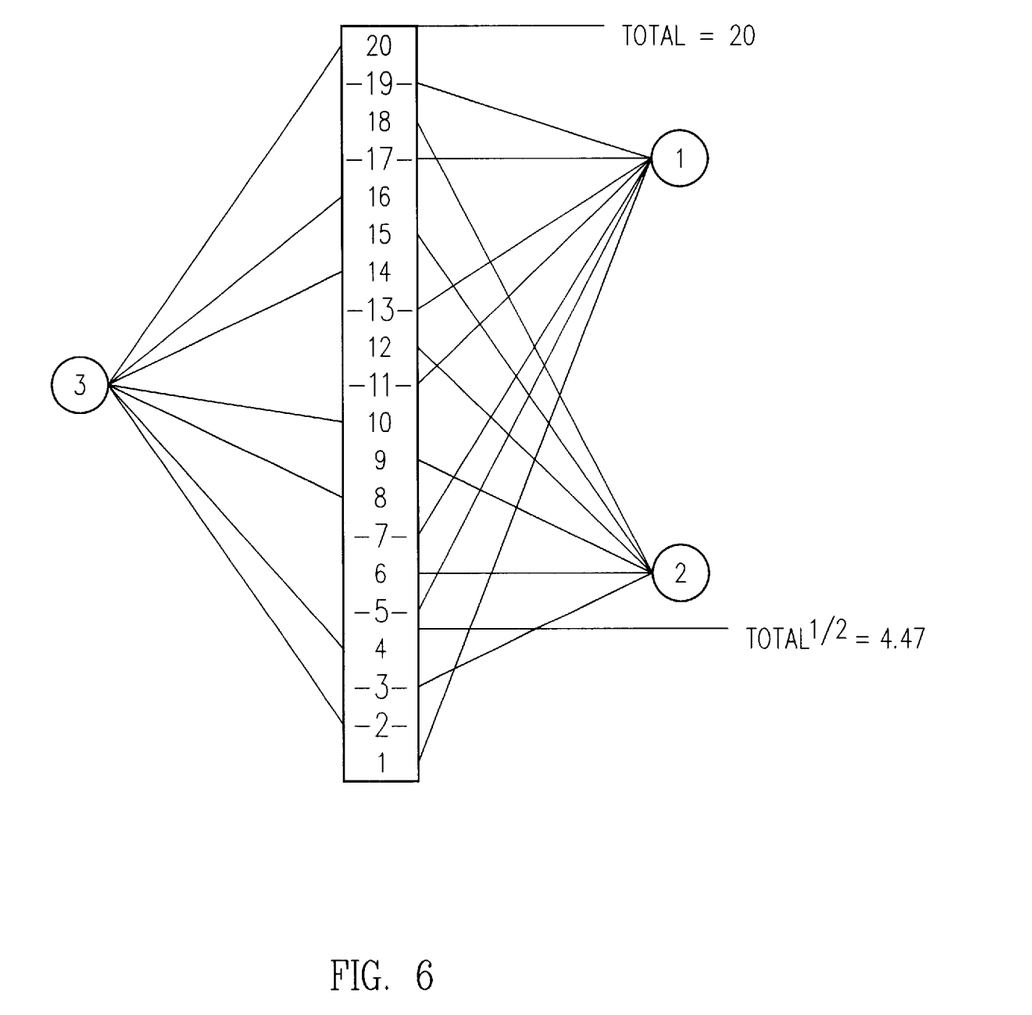
FIG. 6 illustrates an example of interval selection in accordance with an embodiment of the invention.

FIG. 6 illustrates an example of iterative execution using selected test points in accordance with an embodiment of the invention. In this example, the main process being executed has a total of twenty possible test points. A vertical number line is shown, with prime numbers (except the number one) highlighted in bold type (numbers two, three, five, seven, eleven, thirteen, seventeen, nineteen). The encircled numbers 1–3 represent the iteration numbers of each respective execution run.

The selected test points for the first execution run (iteration 1) are determined from the square root of the total number of test points. In this case, the square root of twenty is approximately 4.47. As described with respect to the flow diagram of FIG. 5, the selected test points are those prime number between 4.47 and 20, i.e., the prime numbers five, seven, eleven, thirteen, seventeen and nineteen.

In subsequent execution iterations, the selected test points are chosen at intervals based on respective prime numbers less than or equal to 4.47. For the second execution iteration (iteration 2), the prime number 3 is selected as the test interval because 3 is the closest prime number equal to or less than 4.47. In the third and final execution run (iteration 3), the prime number 2 is selected as the test interval.

Because the test intervals have a minimum value of two, the first test point would be excluded from evaluation during any of the execution iterations descried above. To enable evaluation of the first test point, in accordance with an embodiment of the invention, the first test point is evaluated during the first execution run, in addition to the other selected test points. Alternatively, the first test point may be evaluated during any of the other execution runs.

Figure 7:
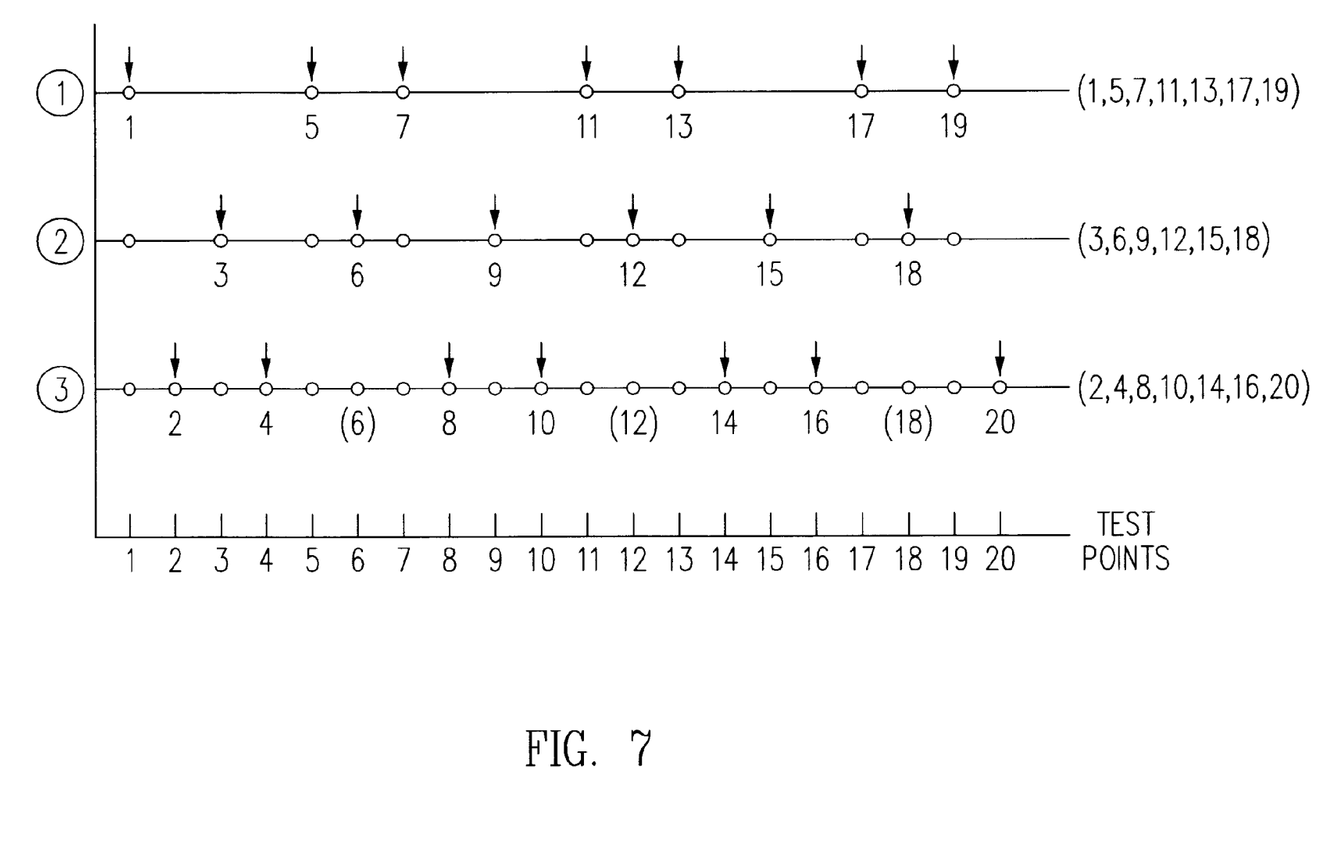
FIG. 7 illustrates an example of test point interval execution across several execution iterations, in accordance with an embodiment of the invention.

FIG. 7 illustrates three test point timelines representing the three execution iterations from the example of FIG. 6. The vertical arrows represent the evaluation of the subprocess at the indicated test point. The existence of the circle at a test point means that the test point is being evaluated during the current execution run, or that the test point was evaluated in a previous execution run.

In the first execution run, evaluation of the subprocess is enacted at the fifth, seventh, eleventh, thirteenth, seventeenth and nineteenth test points. In addition, the illustrated embodiment evaluates the first test point during the first execution run. Alternatively, the first test point may be evaluated during any of the other execution runs.

In the second execution iteration, the test interval is three. Evaluation of the subprocess thus occurs at test points corresponding to multiples of three, i.e., the third, sixth, ninth, twelfth, fifteenth and eighteenth test points. In the third (and final) execution iteration, the test interval is two. Evaluation of the subprocess occurs at the second, fourth, eighth, tenth, fourteenth, sixteenth and twentieth test points. The sixth, twelfth and eighteenth test points correspond to multiples of two and thus could be evaluated in the third iteration. However, as those test points were evaluated in the previous iteration, those test points may be bypassed in the current iteration.

As shown, all possible test points are evaluated within the specified execution iterations. The selected test points are distributed within each execution iteration for maximal debugging coverage in minimal execution time. Also, an equitable distribution of selected test points between execution iterations is achieved for substantially balanced performance.

Figure 8A:
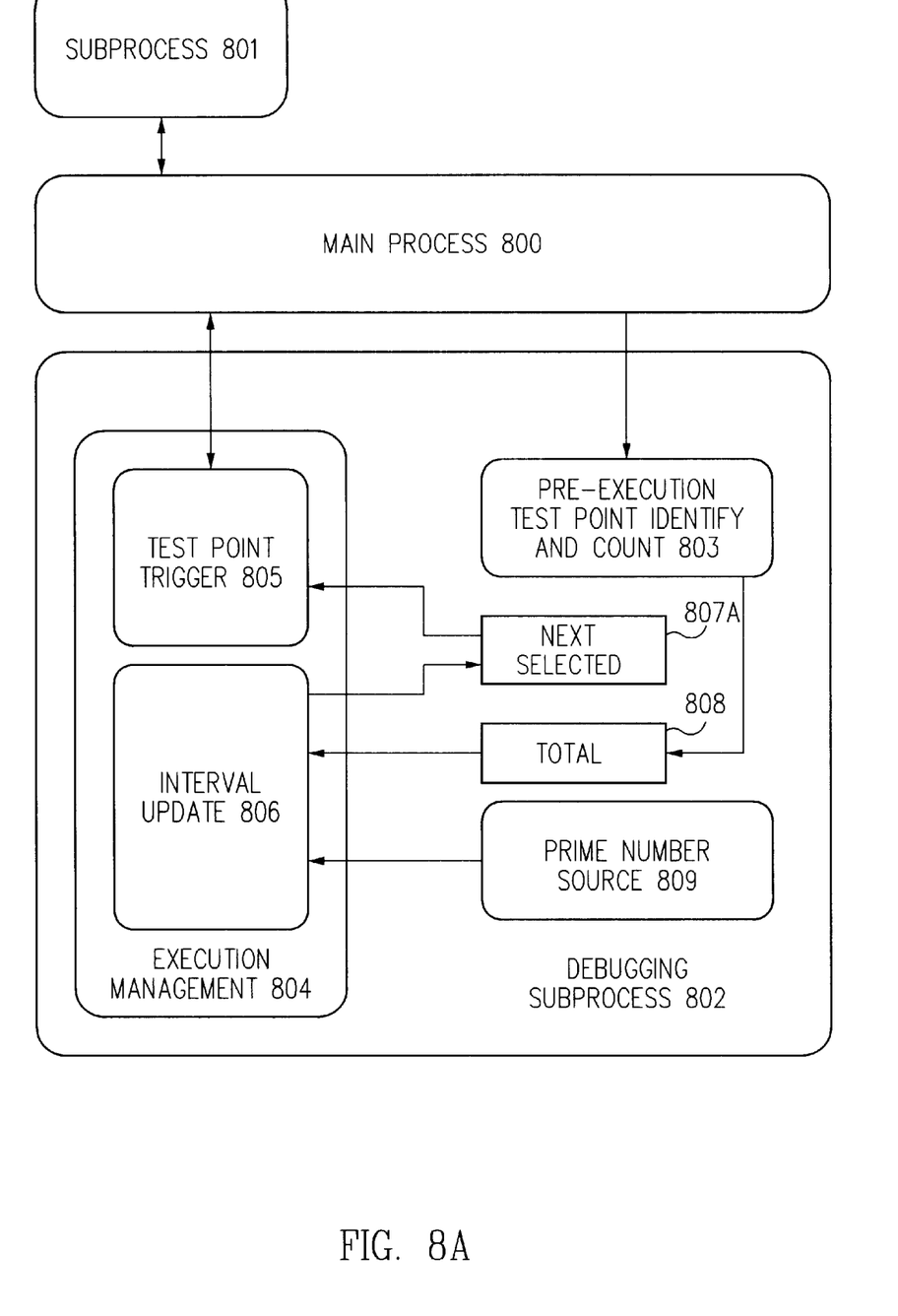
FIGS. 8A–8B are block diagrams of an apparatus for performing test interval execution in accordance with embodiments of the invention.

FIG. 8A is a block diagram of a software testing system in accordance with an embodiment of the invention. The system comprises a main process 800 coupled to a subprocess 801 and a debugging subprocess 802. Main process 800 represents the process containing the multiple test points from which execution may branch to subprocess 801. Debugging subprocess 802 implements the process flows previously described with respect to FIGS. 4–7.

Main process 800 may be a program under test, or it may be a program that is being used to facilitate testing of an underlying system, such as a runtime environment or virtual machine, for example. Subprocess 801 may be, for example, an intermittently executed element of main process 800, a diagnostics subprocess intermittently executed to perform checking or to record state or execution statistics of main process 800, or a subprocess of an underlying system under test (e.g., a garbage collector of a runtime environment). The subject of the debugging/testing may be main process 800 and/or subprocess 801.

Debugging subprocess 802 may be implemented as a separate process, or as a part of main process 800 or the underlying system which is enabled during testing, for example. Debugging subprocess 802 comprises a pre-execution element or module 803 that is used to identify and count test points in main process 800. In the example where main process 800 is a program executed in a runtime environment and subprocess 801 is a garbage collector, pre-execution element 803 may, for example, comprise or have access to a compiler associated with the runtime environment which specifies, during compiling, all possible garbage collection (gc) points in main process 800. The total number of possible test points (808) is stored for use in determining test intervals during execution of main process 800.

Within debugging subprocess 802, a prime number source 809 is provided for obtaining prime number values. Prime number source 809 may be, for example, a function that calculates prime numbers (i.e., a prime number generator) or a table of precalculated prime number values.

Debugging subprocess 802 also comprises an execution management element or module 804 that provides debugging control during execution of main process 800. Execution management element 804 comprises an interval update element 806 and a test point trigger element 805. Interval update element 806 accesses prime number source 809 and stored "total test points" value 808 to update the selected test points in accordance with the process flows previously described, and stores the next selected test point value in storage element 807A.

Test point trigger element 805 accesses storage element 807A to apply the next selected test point value to the occurrences of test points in main process 800. When a test point falls on the selected test point value, test point trigger 805 causes main process 800 to branch to subprocess 801. Test point trigger element 805 may also track which test points have been evaluated in order to bypass those evaluated test points if they should fall on a test interval in a subsequent execution iteration.

Figure 8B:
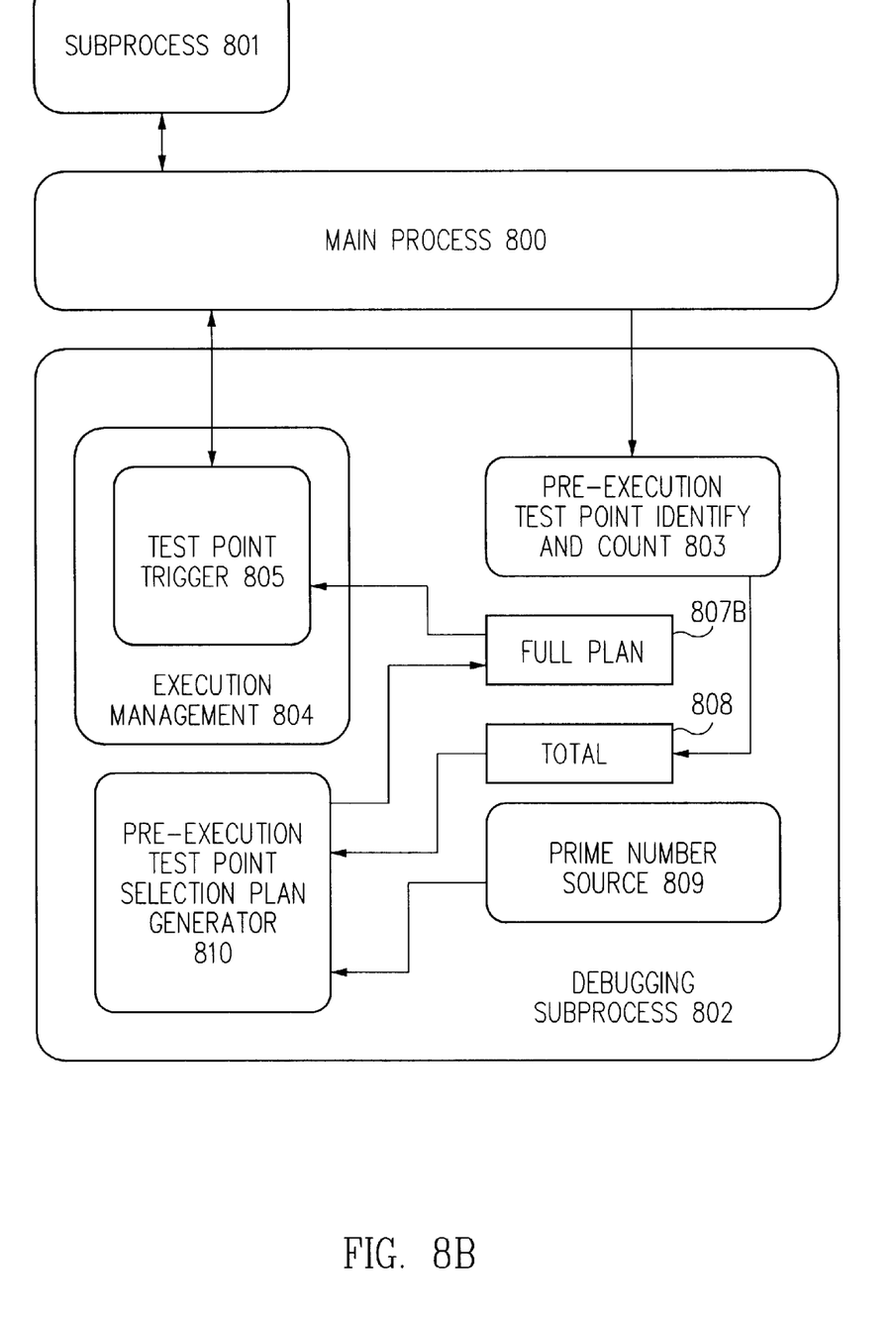

Whereas FIG. 8A is configured to provide a "next selected test point," such as described in the "on the fly" test point selection scheme, FIG. 8B illustrates an embodiment that generates a full plan of predetermined selected test points. Rather than an interval update block 806, FIG. 8B employs a pre-execution test point selection plan generator 810. Generator 810 predetermines all selected test points for each execution iteration in accordance with the methods described herein, and stores the full plan of selected test points in storage element 807B. Test point trigger block 805 access the predetermined selected test point data for use in triggering evaluation at each predetermined test point. Generator 810 may remove all redundancies from the full plan, obviating any need for trigger block 805 to track past test points or compare selected test point values during execution.

The software processes, elements and/or modules described above may be embodied as procedures, routines, methods or any programming operational structure. Further, those process, elements and/or modules may be implemented within procedural, object-oriented or other programming environments.

Though described with reference to computer software processes, elements of the invention may be embodied in computer hardware or software. Further, the process under test in the above description may be a hardware or software process, or a software simulation of a hardware process. The invention may be implemented in any computing environment having a process that contains multiple test points that may be evaluated.

Embodiment of Computer Execution Environment (Hardware)

Figure 9:
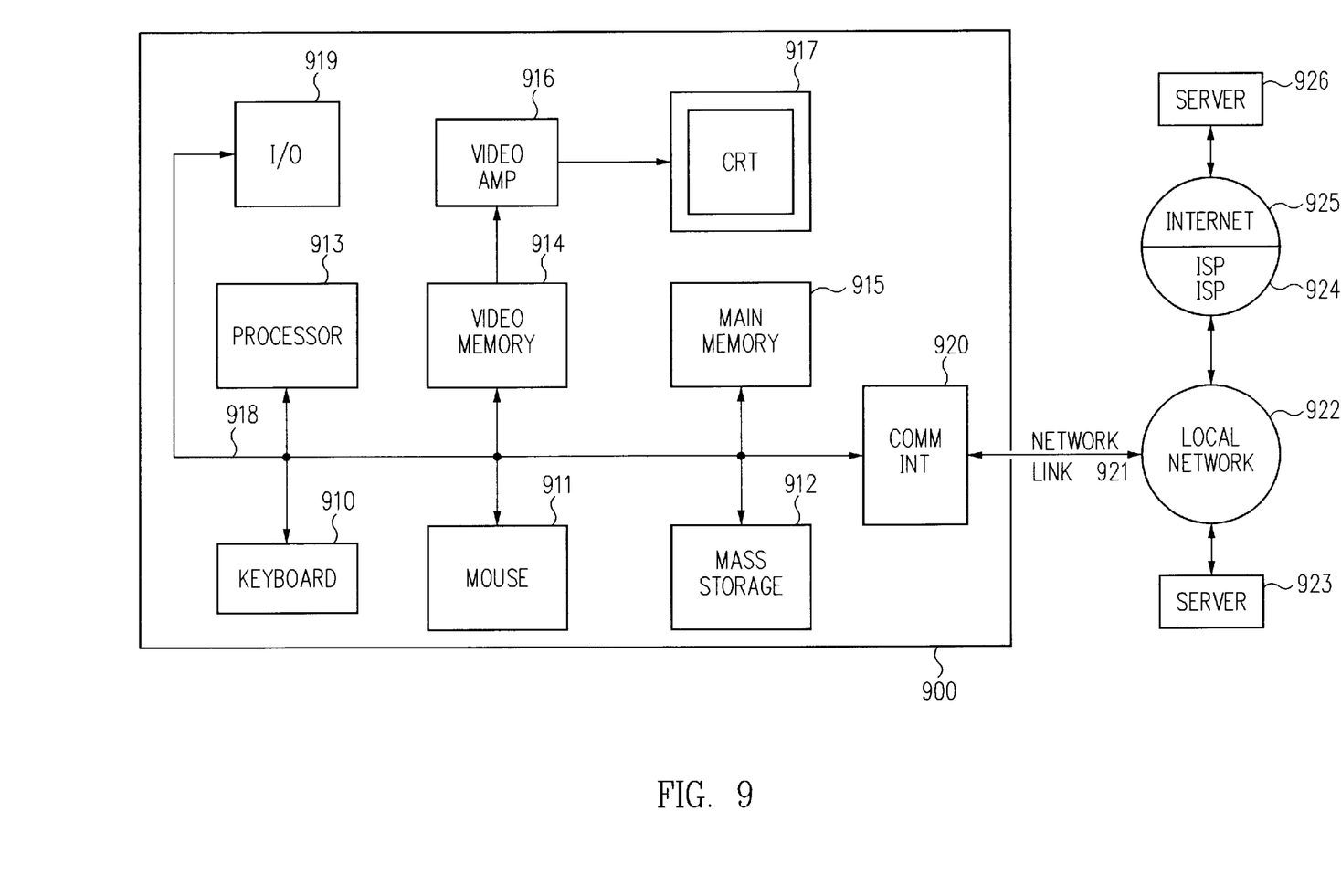
FIG. 9 is a block diagram of one embodiment of a computer system capable of providing a suitable execution environment for an embodiment of the invention.

An embodiment of the invention can be implemented as computer software in the form of computer readable code executed on a general purpose computer such as computer 900 illustrated in FIG. 9, or in the form of programs or class files executable within a runtime environment running on such a computer. A keyboard 910 and mouse 911 are coupled to a system bus 918. The keyboard and mouse are for introducing user input to the computer system and communicating that user input to processor 913. Other suitable input devices may be used in addition to, or in place of, the mouse 911 and keyboard 910. I/O (input/output) unit 919 coupled to system bus 918 represents such I/O elements as a printer, A/V (audio/video) I/O. etc.

Computer 900 includes a video memory 914, main memory 915 and mass storage 912, all coupled to system bus 918 along with keyboard 910, mouse 911 and processor 913. The mass storage 912 may include both fixed and removable media, such as magnetic, optical or magnetic optical storage systems or any other available mass storage technology. Bus 918 may contain, for example, address lines for addressing video memory 914 or main memory 915. The system bus 918 also includes, for example, a data bus for transferring data between and among the components, such as processor 913, main memory 915, video memory 914 and mass storage 912. Alternatively, multiplex data/address lines may be used instead of separate data and address lines.

In one embodiment of the invention, the process 913 is a SPARC™ microprocessor for Sun Microsystems, Inc., or a microprocessor manufactured by Motorola, such as the 680X0 processor, or a microprocessor manufactured by Intel, such as the 80X86, or Pentium processor. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable apparatus. This circuitry converts pixel data stored in video memory 914 to a raster signal suitable for use by monitor 917. Monitor 917 is a type of monitor suitable for displaying graphic images. Alternatively, the video memory could be used to drive a flat panel or liquid crystal display (LCD), or any other suitable data presentation device.

Computer 900 may also include a communication interface 920 coupled to bus 918. Communication interface 920 provides a two-way data communication coupling via a network line 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Communication interface 920 could also be a cable modem or wireless interface. In any such implementation, communication interface 920 sends and receives electrical, electromagnetic or optical signals which carry digital data streams representing various types of information.

Network link 921 typically provides data communication through one or more networks to other data devices. For example, network link 921 may provide a connection through local network 922 to local server computer 923 or to data equipment operated by an Internet Service Provider (ISP) 924. ISP 924 in turn provides data communication services through the world wide packet data communication network now commonly referred to as the "Internet 925". Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Computer 900 can send messages and receive data, including program code, through the network(s), network link 921, and communication interface 920. In the Internet example, remote server computer 926 might transmit a requested code for an application program through Internet 925, ISP 924, local network 922 and communication interface 920.

The received code may be executed by processor 913 as it is received, and/or stored in mass storage 912, or other non-volatile storage for later execution. In this manner, computer 900 may obtain application code in the form of a carrier wave. In accordance with an embodiment of the invention, an example of such a downloaded application is the apparatus for testing a process described herein.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic taps, computer hard drives, servers on a network, and carrier waves.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.). An example of a runtime environment wherein the invention may be implemented is the Java™ Runtime Environment supported, for example, by the Java Virtual Machine™ (JVM™). However, it will be obvious that embodiments of the invention may be similarly implemented in other runtime environments as well.

Thus, a method and apparatus for testing processes in a computer system have been described in conjunction with one or more specific embodiments. The invention is defined by the claims and their full scope of equivalents.

What is claimed is:

1. In a computer system, an apparatus comprising:
   a first process comprising a plurality of test points; and
   a second process configured to cause evaluation of selected test points; and
   wherein, during one or more interval-based execution iterations of the first process, the selected test points comprise a plurality of test points chosen at test intervals, the test intervals dependent on a prime number that is less than or equal to a first value, further wherein;
   subsequent execution iterations are performed evaluating tests points at selected test intervals, where the test intervals for the respective execution iterations correspond to prime numbers less than or equal to the square root of the total number of the test points.

2. The apparatus of claim 1, wherein, during a first execution iteration of the first process, the selected test points correspond to one or more prime numbers greater than the first value.

3. The apparatus of claim 2, wherein the first execution iteration precedes the one or more interval-based execution iterations.

4. The apparatus of claim 2, wherein the one or more interval-based execution iterations precede the first execution iteration.

5. The apparatus of claim 2, wherein, during the first execution run, the selected test points further comprise a first-occurring test point in the plurality of test points.

6. The apparatus of claim 1, wherein, during the one or more interval-based execution iterations, the second process is configured to vary the test intervals between successive execution iterations of the first process.

7. The apparatus of claim 1, wherein the second process is configured to determine a total number of test points in the first process.

8. The apparatus of claim 1, further comprising a subprocess that is executed when one of the selected test points is evaluated.

9. The apparatus of claim 8, wherein the subprocess comprises a garbage collector, and the plurality of test points comprise garbage collection points.

10. The apparatus of claim 9, wherein the first process is executed within a virtual machine.

11. In a computer system, a method for testing a process having a plurality of test oints, comprising:
    performing a plurality of execution iterations;
    during each of the plurality of execution iterations, evaluating selected test points, wherein, during one or more interval-based execution iterations of the process, the selected test points comprise a plurality of test points chosen at test intervals, the test intervals dependent on a prime number that is less than or equal to a first value, further wherein;
    subsequent execution iterations are performed evaluating test points at selected test intervals, where the test intervals for the respective execution iterations correspond to prime numbers less than or equal to the square root of the total number of the test points.

12. The method of claim 11, wherein evaluating a test point comprises executing a subprocess.

13. The method of claim 11, further comprising identifying one or more failed test points.

14. The method of claim 11, further comprising varying the test interval between successive interval-based execution iterations.

15. The method of claim 11, wherein, during a first execution iteration of the process, the selected test points correspond to one or more prime numbers that are greater than the first value.

16. The method of claim 15, wherein, during the first execution iteration, the selected test points comprise a first-occurring test point.

17. The method of claim 15, wherein the first execution iteration precedes the one or more interval-based execution iterations.

18. The method of claim 15, wherein the one or more interval-based execution iterations precede the first execution iteration.

19. A computer program product comprising:
- a computer readable medium having computer program code embodied therein for testing a process having a plurality of test points, the computer readable medium comprising computer program code configured to cause a computer to:
- perform a plurality of execution iterations;
- during each of the plurality of execution iterations, evaluate selected test points, wherein, during one or more interval-based execution iterations of the process, the selected test points comprise a plurality of test points chosen at test intervals, the test intervals dependent on a prime number that is less than or equal to a first value, further wherein;
- subsequent execution iterations are performed evaluating test points at selected test intervals, where the test intervals for the respective execution iterations correspond to prime numbers less than or equal to the square root of the total number of the test points.

20. The computer program product of claim 19, wherein evaluating a test point comprises executing a subprocess.

21. The computer program product of claim 19, wherein the computer program code is further configured to cause the computer to identify one or more failed test points.

22. The computer program product of claim 19, wherein, during a first execution iteration of the process, the selected test points correspond to one or more prime numbers that are greater than the first value.

23. The computer program product of claim 22, wherein, during the first execution iteration, the selected test points comprise a first-occurring test point.

24. The computer program product of claim 22, wherein the first execution iteration precedes the one or more interval-based execution iterations.

25. The computer program product of claim 22, wherein the one or more interval-based execution iterations precede the first execution iteration.

* * * * *